United States Patent
Tundlam et al.

(10) Patent No.: US 7,930,423 B2
(45) Date of Patent: Apr. 19, 2011

(54) DYNAMIC LOAD BALANCING WITHIN A NETWORK

(75) Inventors: Diwakar Tundlam, Sunnyvale, CA (US); Thirumalpathy Balakrishnan, Santa Clara, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1095 days.

(21) Appl. No.: 10/361,984

(22) Filed: Feb. 11, 2003

(65) Prior Publication Data

US 2003/0233472 A1 Dec. 18, 2003

Related U.S. Application Data

(60) Provisional application No. 60/389,051, filed on Jun. 14, 2002.

(51) Int. Cl.
G06F 15/173 (2006.01)
(52) U.S. Cl. ........ 709/238; 709/239; 709/240; 709/241; 709/242; 709/243; 709/244
(58) Field of Classification Search ........... 709/238–244
See application file for complete search history.

(56) References Cited

U.S. PATENT DOCUMENTS

| | | | | |
|---|---|---|---|---|
| 5,860,137 A * | 1/1999 | Raz et al. | ...................... | 711/202 |
| 5,905,723 A * | 5/1999 | Varghese et al. | ............... | 370/351 |
| 6,055,433 A * | 4/2000 | Yuan et al. | ..................... | 455/453 |
| 6,078,960 A * | 6/2000 | Ballard | ......................... | 709/229 |
| 6,128,642 A * | 10/2000 | Doraswamy et al. | ........ | 709/201 |
| 6,173,306 B1 * | 1/2001 | Raz et al. | ...................... | 718/102 |
| 6,259,705 B1 * | 7/2001 | Takahashi et al. | ............. | 370/465 |
| 6,445,679 B1 * | 9/2002 | Taniguchi et al. | ............ | 370/232 |
| 6,473,424 B1 * | 10/2002 | DeJager et al. | ............... | 370/389 |
| 6,502,135 B1 * | 12/2002 | Munger et al. | ................ | 709/225 |
| 6,549,515 B1 * | 4/2003 | Sourani et al. | ............... | 370/232 |
| 6,601,084 B1 * | 7/2003 | Bhaskaran et al. | ........... | 718/105 |
| 6,665,733 B1 * | 12/2003 | Witkowski et al. | ........... | 709/249 |
| 6,691,165 B1 * | 2/2004 | Bruck et al. | .................. | 709/227 |
| 6,725,113 B1 * | 4/2004 | Barto et al. | ..................... | 700/99 |
| 6,775,280 B1 * | 8/2004 | Ma et al. | ........................ | 370/392 |
| 6,778,991 B2 * | 8/2004 | Tenorio | .......................... | 707/10 |
| 6,859,433 B1 * | 2/2005 | Chen et al. | .................... | 370/230 |
| 6,886,035 B2 * | 4/2005 | Wolff | ............................ | 709/219 |
| 6,925,641 B1 * | 8/2005 | Elabd | ........................... | 718/101 |
| 6,940,349 B2 * | 9/2005 | Hellberg | .................. | 330/124 R |
| 6,970,425 B1 * | 11/2005 | Bakshi | .......................... | 370/235 |
| 7,047,309 B2 * | 5/2006 | Baumann et al. | ............. | 709/232 |
| 7,230,925 B2 * | 6/2007 | Li et al. | ......................... | 370/237 |
| 7,254,626 B1 * | 8/2007 | Kommula et al. | ............ | 709/223 |
| 2002/0032777 A1 | 3/2002 | Kawata et al. | | |
| 2002/0099844 A1 | 7/2002 | Baumann et al. | | |
| 2002/0163914 A1 * | 11/2002 | Dooley | ......................... | 370/394 |
| 2003/0037142 A1 * | 2/2003 | Munger et al. | ................ | 709/225 |
| 2003/0167342 A1 * | 9/2003 | Munger et al. | ................ | 709/238 |
| 2004/0133395 A1 * | 7/2004 | Ding et al. | ..................... | 702/182 |

* cited by examiner

*Primary Examiner* — John Follansbee
*Assistant Examiner* — Saket K Daftuar
(74) *Attorney, Agent, or Firm* — Wilson & Ham & Holman

(57) ABSTRACT

A method and system for distributing data packets within a network node is disclosed. The method and system for distributing data packets within a network node involves the utilization of a moving weighted average function to dynamically distribute the data packets in a balanced fashion. By utilizing a moving weighted average function to dynamically distribute the data packets in a balanced fashion, data packets are distributed more efficiently thereby increasing the overall efficiency of network operations. The method and system include computing a ratio matrix based on a moving weight average function of a load over a plurality of data ports and distributing data packets to the plurality of data ports based on the ratio matrix.

23 Claims, 4 Drawing Sheets

DYNAMIC LOAD BALANCING WITHIN A NETWORK

CROSS REFERENCE TO RELATED APPLICATIONS

This application is entitled to the benefit of provisional U.S. Patent Application Ser. No. 60/389,051, filed Jun. 14, 2002.

FIELD OF THE INVENTION

The present invention relates generally to computer networks and more specifically to techniques for distributing data packets in a network.

BACKGROUND OF THE INVENTION

The Internet includes a network of interconnected routers that route data packets over one or more links between a source Internet Protocol (IP) address and a destination IP address. Successful routing of data packets requires that a logical path (a collection of one or more links) exist in the network between the source IP address and destination IP address for that packet. Based on the contents of its routing table, each router along the path determines the best path on which to send each packet in order to deliver the packets to the ultimate destination. Assuming the network possesses sufficient physical redundancy (e.g., multiple routers, multiple links), the network can dynamically redefine paths using protocols such as the Border Gateway Protocol (BGP) or Open Shortest Path First (OSPF) protocol, in case of a router or link failure. The use of such protocols ensures that no one router or link failure disrupts the flow of packets between a source IP address and destination IP address.

When there is a relatively large volume of traffic between two network switches, it is helpful to link several ports of the two switches together to provide more than one path between the two switches. Multiple links can be provided by separate transmission lines, each connecting an output port of one switch to an input port of another switch. Such links could also be provided by a high speed multiplexer/demultiplexer system connected to several input/output ports of each switch. A multiplexer at one end of a transmission line receives data packet transmissions concurrently from several output ports of one switch and multiplexes them onto the high speed transmission line. A demultiplexer at the opposite end of the transmission line separates the packets and routes them concurrently into separate input ports of another switch. The two switches, however, simply view the multiplexer/demultiplexer system as several separate paths.

In order to make efficient use of multiple paths between network switches it is desirable to distribute the transmission load evenly over those multiple paths. But load balancing has been problematic. Recall that a switch input port receiving a packet consults an address translation system to find out which switch output port is to receive the packet. Although the address translation system may assign many different network destination addresses to the same switch output port, it can assign each network address to one and only one output port. Thus, for example, when 10 output ports of a first switch are connected to 10 input ports of a second switch by 10 transmission lines, the first switch can forward an incoming data packet addressed to a network station connected to the second switch via only one of the 10 output ports. If that particular output port is busy, packet transmission is blocked and the input port has to store the packet until the particular output port is available, even if the other nine output ports linked to the second switch are idle.

Conventional load balancing schemes calculate a distribution ratio based on the current actual load on each port. New flows are subsequently assigned to ports using this calculated distribution ratio whereby new flows are assigned to the least loaded ports. This tends to make the system highly unstable because of the bursty nature of Internet traffic and a distribution ratio using only the instant load on the system tends to either overshoot or undershoot the target traffic rate. This is commonly termed as 'hunting' and can cause drastic reduction in the throughput of the system.

Accordingly, what is needed is a method and system that addresses the above-described short-comings of conventional load balancing techniques. The method and system should be simple, cost effective and capable of being easily adapted into existing technology. The present invention addresses such a need.

SUMMARY OF THE INVENTION

A method and system for distributing data packets within a network node involves the utilization of a moving weighted average function to dynamically distribute the data packets in a balanced fashion. By utilizing a moving weighted average function to dynamically distribute the data packets in a balanced fashion, data packets are distributed more efficiently thereby increasing the overall efficiency of network operations.

An embodiment of the invention includes a method for distributing data packets within a network node. The method comprises computing a ratio matrix based on a moving weighted average function of a load over a plurality of data ports within the network and distributing data packets to each of the plurality of data ports based on the ratio matrix.

In another embodiment of the method, computing a ratio matrix based on a moving weighted average function includes taking a reading of the plurality of data ports and using the moving weighted average function to compute the ratio matrix based on the reading.

Another embodiment of the invention includes a system for distributing data packets within a network. The system comprises means for computing a ratio matrix based on a moving weighted average function of a load over a plurality of data ports within the network and distributing data packets to each of the plurality of data ports based on the ratio matrix.

In another embodiment of the system, the means for computing a ratio matrix based on a moving weighted average function includes means for taking a reading of the plurality of data ports and using the moving weighted average function to compute the ratio matrix based on the reading.

A third embodiment of the invention includes a router for use in a computer network. The router comprises a plurality of data ports and a controller coupled to each of the plurality of data ports wherein the controller includes route distribution logic wherein the route distribution logic comprises logic for computing a ratio matrix based on a moving weighted average function of a load over a plurality of data ports within the network and distributing data packets to each of the plurality of data ports based on the ratio matrix.

In another embodiment of the router, the router further comprises at least one statistics counter coupled to each of the plurality of ports, and the route distribution logic further comprises logic for reading the at least one statistics counter and computing the ratio matrix based on the reading.

Other aspects and advantages of the present invention will become apparent from the following detailed description, taken in conjunction with the accompanying drawings, illustrating by way of example the principles of the invention.

DETAILED DESCRIPTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol (TCP/IP), which was specifically designed for the interconnection of different computer systems. Internal and external networks are linked by network nodes, such as routers that route data packets from a sending network to another router or a receiving network. Network nodes referred to as gateways handle data transfer and conversion of messages from a sending network to the protocols used by a receiving network. Typically, gateways refer to devices that translate between applications. For example, e-mail gateways translate messages from one vendor's messaging program to another vendor's messaging program so that users with different e-mail programs can share messages over a network.

A method and system for distributing data packets within a network node involves the utilization of a moving weighted average function to dynamically distribute the data packets in a balanced fashion. By utilizing a moving weighted average function to dynamically distribute the data packets in a balanced fashion, data packets are distributed more efficiently thereby increasing the overall efficiency of network operations.

Figure 1:
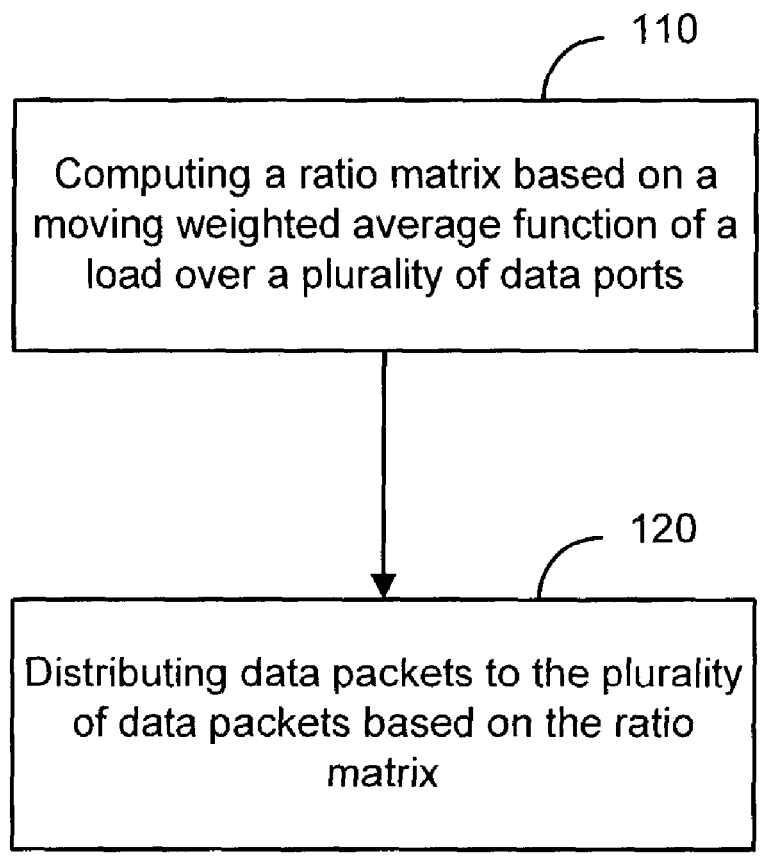
FIG. 1 depicts a flowchart of a method for distributing data packets within a network node in accordance with an embodiment of the invention.

FIG. 1 depicts a flowchart of a method for distributing data packets within a network node. At block 110, a ratio matrix is computed based on a moving weighted average function of a load over a plurality of data ports. At block 120, data packets are distributed to each of the plurality of data ports based on the ratio matrix.

In this scheme, statistics counters are utilized on each physical port of the network router to provide a measure of the instantaneous traffic rate on the port. These counters are periodically polled to measure the current instantaneous traffic rate on each of the physical ports. This is the measure of "load" on the port. These measurements are then "smoothed" out utilizing a moving weighted average function that takes into account a recent history of the actual measurements of load on the port. This ensures that wide variations in actual instantaneous load do not adversely affect the estimate of average load on the port.

Figure 2:
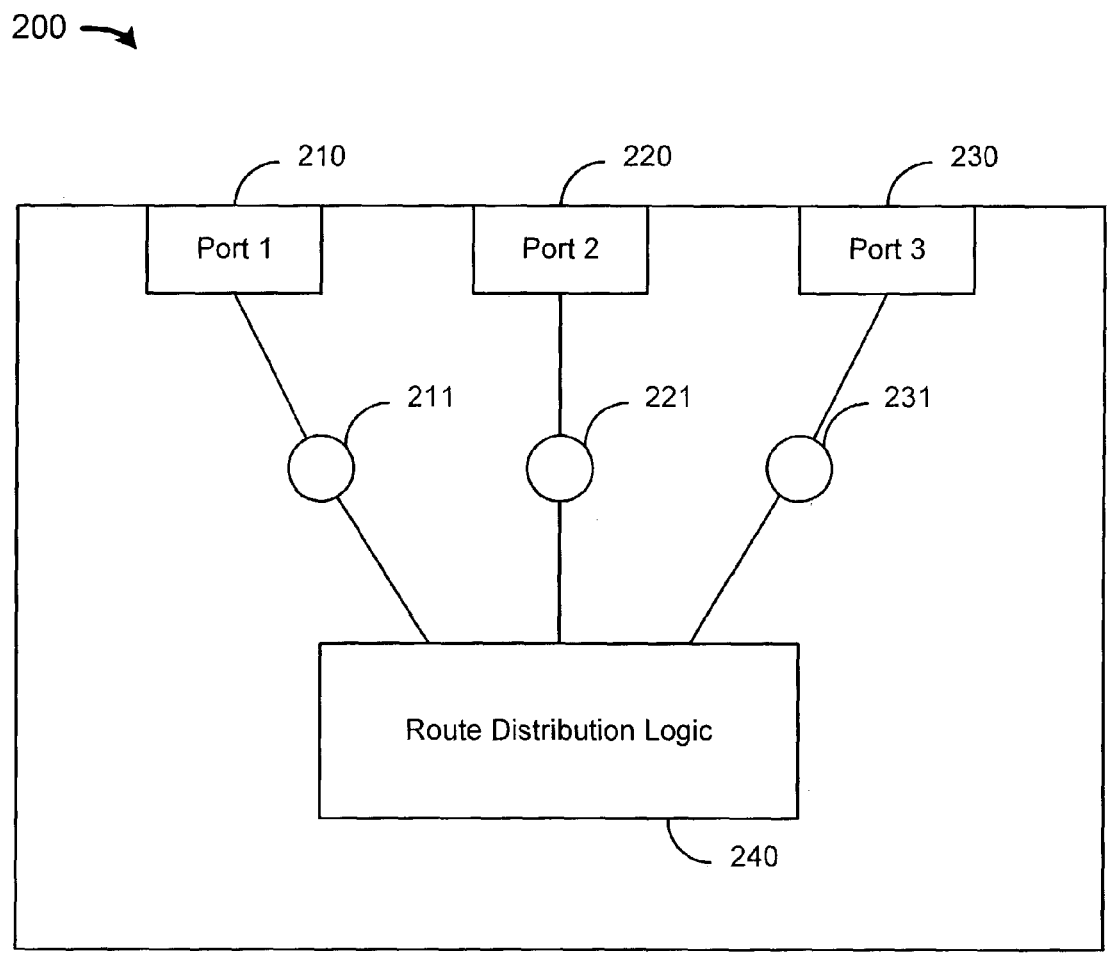
FIG. 2 is an illustration of a network router in accordance with an embodiment of the invention.

Please refer now to FIG. 2. FIG. 2 is an illustration of a router 200 in accordance with an embodiment of the invention. The router 200 includes a plurality of data ports 210, 220, 230 whereby each of the plurality of data ports 210, 220, 230 are respectively coupled to a statistics counter 211, 221, 231. The statistics counters 211, 221, 231 are coupled to route distribution logic 240. Based on information received from the statistics counters 211, 221, 231, the route distribution logic 240 utilizes a moving weighted average function to evenly distribute the load amongst the plurality of data ports 210, 220, 230.

In an embodiment, the moving weighted average function implements the following relationship:

$$NL_{ave}=(\alpha * P_{ave})+[(1-\alpha)*P_{inst}]$$

Where is the new average load on each port, the $P_{ave}$ is the present average load on each port and $P_{inst}$ is the present instantaneous load on each port. $\alpha$ is an adjustable damping/tuning constant that ranges in value from 0.0 to 1.0. Typically, $\alpha$ is less than 1.0. By adjusting $\alpha$, the moving weighted average function can be made to give a wide variation in behavior ranging from 'most stable' to 'most sensitive'.

Figure 3:
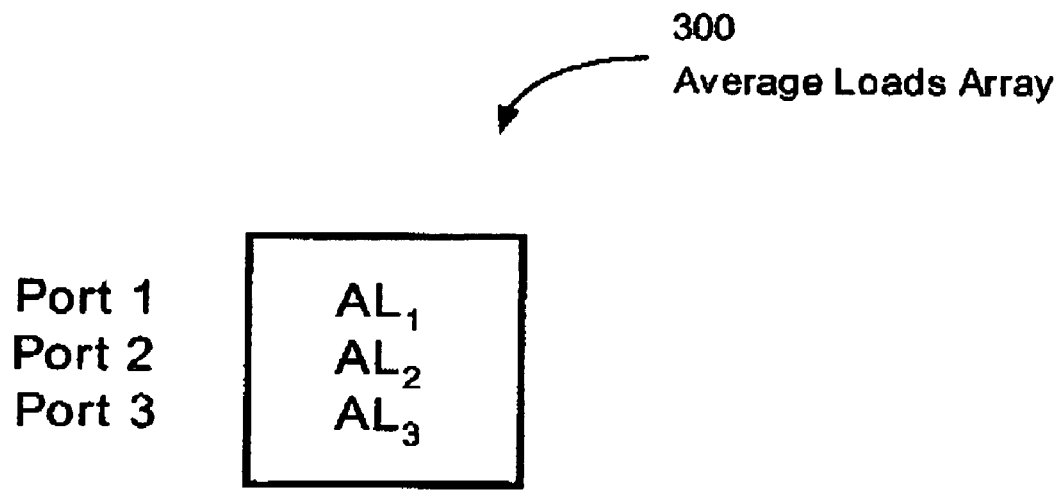
FIG. 3 shows an array of average loads on the network ports in accordance with an embodiment of the invention.

The route distribution logic 240 keeps track of $P_{ave}$ on each of the data ports 210, 220, 230 and an array of average loads, ($AL_{1-n}$), is generated. FIG. 3 shows an array of average loads 300 in accordance with an embodiment of the invention. After a predetermined period of time, the array is overwritten with re-computed values (i.e., $NL_{ave}$) based on the instantaneous load. The "averages array" now contains a description of load-distribution among the physical ports in the router.

Figure 4:
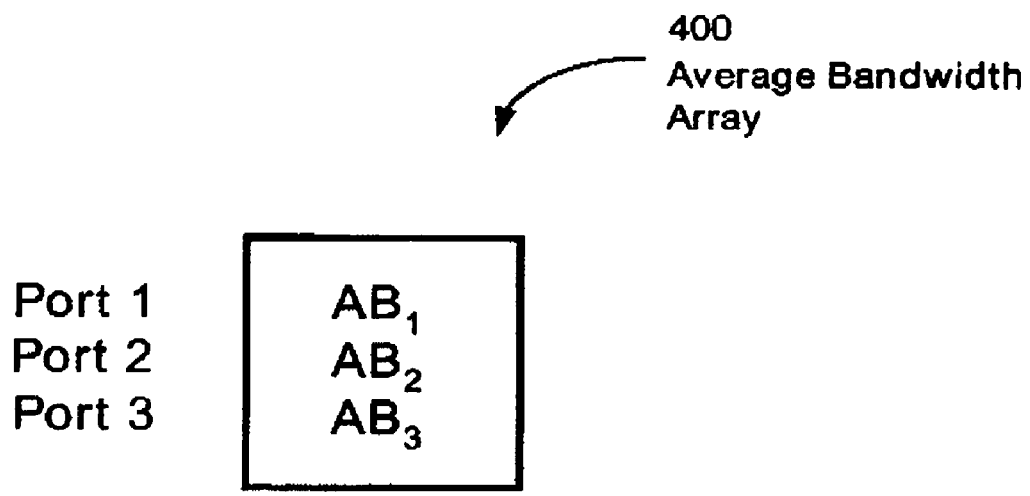
FIG. 4 show an array of available bandwidth on the network ports in accordance with an embodiment of the invention.

A new array is then computed from this array by subtracting each element in the array of average loads 300 from the physical maximum load (bandwidth) of each port. This new array now describes the average available bandwidth, ($AB_{1-n}$), on each physical port. FIG. 4 shows an array of average available bandwidths 400 in accordance with an embodiment of the invention. This array is then normalized to the total physical bandwidth available on all the ports (e.g. $AB_1/AB_{total}$, $AB_2/AB_{total}$, $AB_3/AB_{total}$, etc.) to produce a normalized array that describes the normalized average available bandwidth of each of the physical ports in the system. Since this array is normalized, it is actually a ratio-matrix (a matrix with just one column). New data streams are directed to the corresponding physical ports based on this ratio matrix for a predetermined period of time, after which the ratio matrix is discarded. After the predetermined period of time, a new ratio matrix is computed based on the new average loads for each port.

For example, a $P_{ave}$ for each port 210, 220, 230 is established and the $P_{inst}$ is determined via the statistics counters 211, 221, 231. Based on a selected value of $\alpha$, the $NL_{ave}$ for each port 210, 220, 230 is then determined. At this point, a new value of $P_{ave}$ for each port 210, 220, 230 is set to equal the calculated $NL_{ave}$. Consequently, the next implementation of the function (i.e. the next ratio matrix computation) utilizes the new $P_{ave}$ value to calculate a new value for $NL_{ave}$. As a result, each new value for $NL_{ave}$ is calculated based on the previous value for $NL_{ave}$ and the current value of $P_{inst}$ as calculated by statistics counters 211, 221, 231. Hence, each subsequent value for $NL_{ave}$ for each port 210, 220, 230

"moves" from the previous $NL_{ave}$ value based on the history of recent $NL_{ave}$ values and the $P_{inst}$ of the port. Again, the tuning constant α can be adjusted to adapt to different variations in bandwidth of the ports 210, 220, 230 and can be made to give a wide variation in behavior ranging from 'most stable' to 'most sensitive'.

Figure 5:
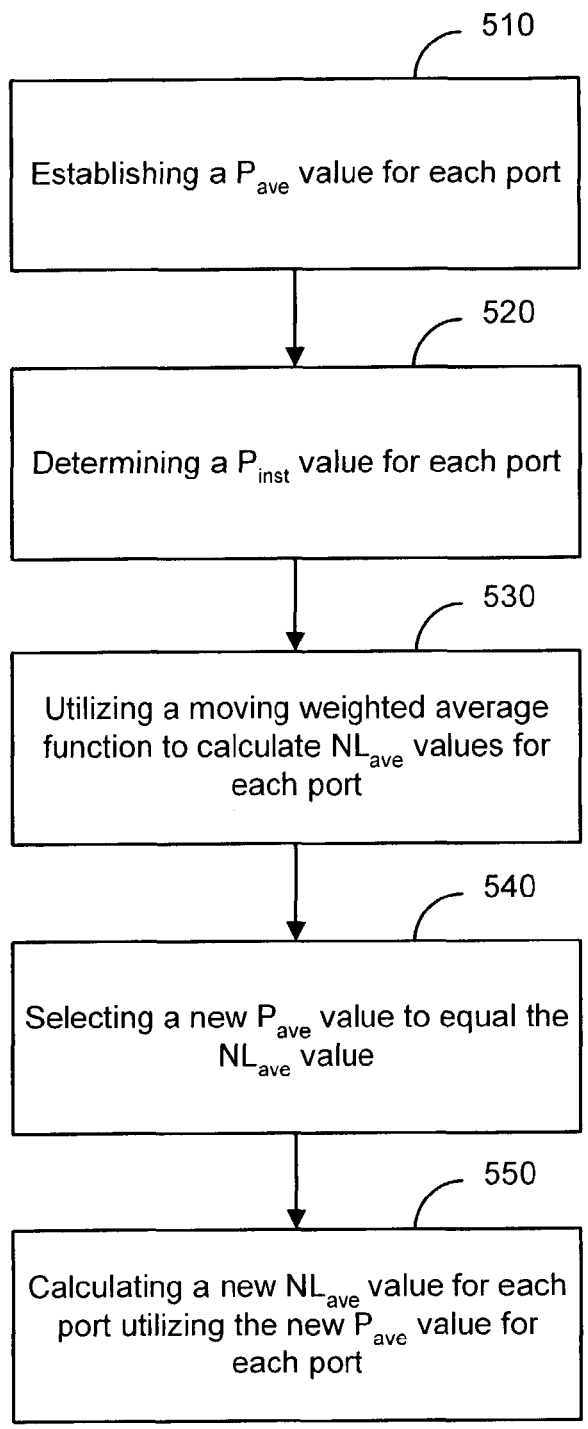
FIG. 5 is a more detailed flowchart that further describes the method in accordance with an embodiment of the invention.

FIG. 5 is a more detailed flowchart that further describes the method in accordance with an embodiment of the invention. At block 510, a $P_{ave}$ for each port is established. For example, $P_{ave}$ may be established at an initial value of zero. Next, at block 520, $P_{inst}$ for each port is determined. In an embodiment, $P_{inst}$ is determined via statistics counters coupled to each port. At block 530, $NL_{ave}$ is calculated for each port utilizing the moving weighted average function. In an embodiment, the $NL_{ave}$ values for each port are normalized into a ratio matrix whereby the ratio matrix is implemented in distributing data to each of the ports. At block 540, $P_{ave}$ is set to equal $NL_{ave}$. Finally, at block 550, new $NL_{ave}$ values are calculated utilizing the new $P_{ave}$ value after a predetermined period of time. In an embodiment, a new ratio matrix is created based on the new $NL_{ave}$ values.

During this predetermined period of time, the actual load being assigned to the physical ports does not need to be considered. The reasons why the actual load being directed to the physical ports can be disregarded are threefold. First, normally flows are TCP flows and when a new flow is established, it is typically the beginning of a three-way TCP handshake necessary to establish a TCP flow. These packets are typically very small SYN/ACK packets, which are inconsequential from a load point of view. Accordingly, after the usual TCP slow start phase, it is expected that the ratio matrix will have been re-computed. Secondly, even if the flows instantaneously start pumping traffic at the highest possible rates, iteratively using the same ratio matrix ensures that these flows get distributed evenly across the physical ports.

Finally, if there are serious imbalances in load-distribution due to improper assignment of new flows to physical ports, it will only last for one period. The next time the ratio matrix is computed, the surge in load on the affected physical ports will immediately cause the average load values to jump up, causing these ports to drop to the bottom of the ratio matrix of ports with available bandwidth. Accordingly, by utilizing actual measured statistics of the data ports, system stability is self-regulated.

It should be noted that for the purposes of the above computations, it is not necessary that the physical ports be of the same type or to be capable of passing the same bandwidth as each other. Accordingly, one of ordinary skill in the art will readily recognize that the above-described load balancing scheme can be implemented for any of a combination of heterogeneous physical ports while remaining within the spirit and scope of the invention.

An embodiment of the invention may also be implemented, for example, by operating a computer system to execute a sequence of machine-readable instructions. The instructions may reside in various types of computer readable media. In this respect, another embodiment of the invention concerns a programmed product, comprising computer readable media tangibly embodying a program of machine readable instructions executable by a digital data processor to perform a method for distributing data packets within a network node.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

A method and system for distributing data packets within a network node is disclosed. The method and system for distributing data packets within a network node involves the utilization of a moving weighted average function to dynamically distribute the data packets in a balanced fashion. By utilizing a moving weighted average function to dynamically distribute the data packets in a balanced fashion, data packets are distributed more efficiently thereby increasing the overall efficiency of network operations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for distributing data packets within a network comprising:
   iteratively establishing a present average load ($P_{ave}$) for each data port of a plurality of data ports of a network node, wherein the present average load ($P_{ave}$) comprises a moving average based on a previous present average load ($P_{ave}$) and a present instantaneous load ($P_{inst}$);
   computing a normalized average available bandwidth for each said data port based on said present average load ($P_{ave}$) of each said data port; and
   distributing data packets to said plurality of data ports based on said normalized average available bandwidth of each said data port;
   iteratively measuring the present instantaneous load ($P_{inst}$) for each said data port, wherein said measuring is performed after a predetermined period of time;
   iteratively computing a new average load ($NL_{ave}$) for each said data port, wherein said new average load ($NL_{ave}$) is given by the equation:
   ($NL_{ave} = (\alpha * P_{ave}) + [(1-\alpha) * P_{inst}]$), wherein α is an adjustable tuning constant ranging in value from 0.0 to 1.0 and wherein $NL_{ave} = (0.5 * P_{ave}) + [(0.5) * P_{inst}]$ when α is 0.5.

2. The method of claim 1 further comprising:
   iteratively setting ($P_{ave}$) to a value equal to ($NL_{ave}$); and
   re-computing ($NL_{ave}$) based on the value of ($P_{ave}$).

3. The method of claim 1 further comprising:
   selecting a value for α, wherein α is less than 1.0.

4. The method of claim 1 further comprising:
   computing an average available bandwidth (AB) for each said data port, wherein said average available bandwidth (AB) is the difference between said present average load ($P_{ave}$) and a physical maximum bandwidth ($AB_{total}$) of each said data port.

5. The method of claim 1 wherein said normalized average available bandwidth for each said data port comprises a ratio of an average available bandwidth (AB) to a physical maximum bandwidth ($AB_{total}$) ($AB/AB_{total}$) for each said data port.

6. The method of claim 1 wherein said normalized average available bandwidth for each said data port of said plurality of data ports provides a ratio matrix for said network node, and the method further comprises:
iteratively discarding and re-computing said normalized average available bandwidth of each said data port to provide a new ratio matrix.

7. A system for distributing data packets within a network comprising:
a router having route distribution logic configured to:
iteratively establish a present average load ($P_{ave}$) for each data port of a plurality of data ports of a network node, wherein the present average load ($P_{ave}$ comprises a moving average based on a previous present average load ($P_{ave}$) and a present instantaneous load ($P_{inst}$);
compute a normalized average available bandwidth for each said data port based on said present average load ($P_{ave}$) of each said data port; and
distribute data packets to the plurality of data ports based on said normalized average available bandwidth of each said data port;
iteratively measure the present instantaneous load ($P_{inst}$) for each said data port;
iteratively compute a new average load ($NL_{ave}$) for each said data port, wherein said new average load ($NL_{ave}$) is given by the equation:

$$(NL_{ave}=(\alpha*P_{ave})+[(1-\alpha)*P_{inst}]),$$

wherein $\alpha$ is an adjustable tuning constant with a value ranging from 0.0 to 1.0 and wherein $NL_{ave}=(0.5*P_{ave})+[(0.5)*P_{inst}]$ when $\alpha$ is 0.5.

8. The system of claim 7 wherein said means for iteratively measuring the present instantaneous load ($P_{inst}$) comprises a statistics counter coupled to each said data port, and said measuring is performed after a predetermined period of time.

9. The system of claim 7 wherein said means for distributing data packets to said plurality of data ports comprises route distribution logic of a network router, and said network node comprises said network router.

10. The system of claim 7 wherein $\alpha$ is less than 1.0.

11. The system of claim 7 further comprising:
means for computing an average available bandwidth (AB) for each said data port, wherein said average available bandwidth (AB) is the difference between said present average load ($P_{ave}$) and a physical maximum bandwidth ($AB_{total}$) of each said data port.

12. The system of claim 7 wherein said normalized average available bandwidth for each said data port comprises a ratio of an average available bandwidth (AB) to a physical maximum bandwidth ($AB_{total}$) ($AB/AB_{total}$) for each said data port.

13. A non-transitory computer readable storage medium in a network router comprising program instructions for distributing data packets within a network, the program instructions comprising instructions for:
iteratively establishing a present average load ($P_{ave}$) for each data port of a plurality of data ports of a network node, wherein the present average load ($P_{ave}$) comprises a moving average based on a previous present average load ($P_{ave}$) and a present instantaneous load ($P_{inst}$);
computing a normalized average available bandwidth for each said data port based on said present average load ($P_{ave}$) of each said data port; and
distributing data packets to said plurality of data ports based on said normalized average available bandwidth of each said data port;
iteratively measuring the present instantaneous load ($P_{inst}$) for each said data port, and wherein said measuring is performed after a predetermined period of time;
iteratively computing a new average load ($NL_{ave}$) for each said data port, wherein said new average load ($NL_{ave}$) is given by the equation:

$$(NL_{ave}=(\alpha*P_{ave})+[(1-\alpha)*P_{inst}]),$$

wherein $\alpha$ is an adjustable tuning constant ranging in value from 0.0 to 1.0 and wherein $NL_{ave}=(0.5*P_{ave})+[(0.5)*P_{inst}]$ when $\alpha$ is 0.5.

14. The non-transitory computer readable storage medium of claim 13 wherein said program instructions further comprise instructions for:
iteratively setting ($P_{ave}$) to a value equal to ($NL_{ave}$); and
re-computing ($NL_{ave}$) based on the value of ($P_{ave}$).

15. The non-transitory computer readable storage medium of claim 13 wherein said program instructions further comprise instructions for:
selecting a value for $\alpha$, wherein $\alpha$ is less than 1.0.

16. The non-transitory computer readable storage medium of claim 13 wherein said program instructions further comprise instructions for:
computing an average available bandwidth (AB) for each said data port, wherein said average available bandwidth (AB) is the difference between said present average load ($P_{ave}$) and a physical maximum bandwidth ($AB_{total}$) of each said data port.

17. The non-transitory computer readable storage medium of claim 13 wherein said normalized average available bandwidth for each said data port comprises a ratio of an average available bandwidth (AB) to a physical maximum bandwidth ($AB_{total}$) ($AB/AB_{total}$) of each said data port.

18. The non-transitory computer readable storage medium of claim 13 wherein said normalized average available bandwidth for each said data port of said plurality of data ports provides a ratio matrix for said network node, and the program instructions further comprise instructions for:
iteratively discarding and re-computing said normalized average available bandwidth of each said data port to provide a new ratio matrix.

19. A network router comprising:
a plurality of data ports; and
route distribution logic coupled to each of said plurality of data ports, wherein said route distribution logic comprises logic for:
iteratively establishing a present average load ($P_{ave}$) for each data port of a plurality of data ports of a network node, wherein the present average load ($P_{ave}$) comprises a moving average based on a previous present average load ($P_{ave}$) and a present instantaneous load ($P_{inst}$);
computing a normalized average available bandwidth for each said data port based on said present average load ($P_{ave}$) of each said data port; and
distributing data packets to said plurality of data ports based on said normalized average available bandwidth of each said data port;
further comprising at least one statistics counter coupled to each of said plurality of ports, wherein said route distribution logic further comprises logic for:
reading said at least one statistics counter; and
computing said normalized average available bandwidth for each said data port based on said reading;

wherein said at least one statistics counter iteratively measures the present instantaneous load ($P_{inst}$) on each of said plurality of data ports, and said route distribution logic computes said normalized average available bandwidth for each said data port based on said present average load ($P_{ave}$) on each of said plurality of data ports;

wherein said route distribution logic computes a new average load ($NL_{ave}$) for each said data port according to the following relationship:

$$(NL_{ave}=(\alpha * P_{ave})+[(1-\alpha)*P_{inst}]),$$

wherein $\alpha$ is an adjustable tuning constant ranging in value from 0.0 to 1.0 and wherein $NL_{ave}=(0.5*P_{ave})+[(0.5)*P_{inst}]$ when $\alpha$ is 0.5.

20. The network router of claim 19 wherein the reading is taken after a predetermined period of time.

21. The network router of claim 19 wherein $\alpha$ is less than 1.0.

22. The network router of claim 19 wherein a value for ($P_{ave}$) is iteratively set to a value equal to ($NL_{ave}$) for each of said plurality of data ports.

23. The network router of claim 22 wherein new values of ($NL_{ave}$) are calculated for each of said plurality of data ports based on the values for ($P_{ave}$).

* * * * *